(12) United States Patent
Agrawal et al.

(10) Patent No.: US 8,331,427 B2
(45) Date of Patent: Dec. 11, 2012

(54) DATA PROCESSING APPARATUS

(75) Inventors: Sandeep Agrawal, Eindhoven (IN);
Sathya Jaganathan, Eindhoven (NL);
Johannes Boonstra, Eindhoven (NL)

(73) Assignee: ST Ericsson SA, Plan-les-Ouates (CH)

( * ) Notice: Subject to any disclaimer, the term of this patent is extended or adjusted under 35 U.S.C. 154(b) by 0 days.

(21) Appl. No.: 12/876,782

(22) Filed: Sep. 7, 2010

(65) Prior Publication Data

US 2011/0116557 A1    May 19, 2011

Related U.S. Application Data

(63) Continuation of application No. 12/768,947, filed on Apr. 28, 2010, now abandoned, which is a continuation of application No. 12/634,541, filed on Dec. 9, 2009, now abandoned, which is a continuation of application No. 12/467,850, filed on May 18, 2009, now abandoned, which is a continuation of application No. 12/259,140, filed on Oct. 27, 2008, now abandoned, which is a continuation-in-part of application No. PCT/IB2007/051495, filed on Apr. 24, 2007.

(30) Foreign Application Priority Data

Apr. 28, 2006 (EP) ..................................... 06113305

(51) Int. Cl.
*H04B 1/38* (2006.01)
(52) U.S. Cl. ......................................... 375/219; 375/355
(58) Field of Classification Search ................... 375/219, 375/257, 370, 355
See application file for complete search history.

(56) References Cited

U.S. PATENT DOCUMENTS

| 7,277,970 | B2 * | 10/2007 | Ellerbrock et al. | 710/62 |
| 2003/0154336 | A1 * | 8/2003 | Ballantyne et al. | 710/110 |
| 2003/0195645 | A1 * | 10/2003 | Pillay et al. | 700/94 |
| 2004/0062331 | A1 | 4/2004 | Samuel | |
| 2006/0069810 | A1 * | 3/2006 | Levy et al. | 709/248 |

FOREIGN PATENT DOCUMENTS

| EP | 0605751 A1 | 7/1994 |
| EP | 1158735 A1 | 11/2001 |

* cited by examiner

*Primary Examiner* — Don N Vo
(74) *Attorney, Agent, or Firm* — Potomac Patent Group PLLC

(57) ABSTRACT

A universal asynchronous receiver-transmitter module that includes a sampling controller that assigns a variable number of active edges in a clock signal to respective bits in a serial data signal. A serial data reception path derives a bit from the serial data signal on the basis of the variable number of active edges that the sampling controller has assigned to the bit.

16 Claims, 4 Drawing Sheets

URM

DATA PROCESSING APPARATUS

BACKGROUND

1. Technical Field

The present disclosure relates to a data processing apparatus, such as a personal computer, a cellular phone, or any other type of multimedia or communication apparatus, that utilizes a universal asynchronous receiver-transmitter (UART), and to a method of asynchronous data communication, a computer program product for a programmable processor, and a UART module.

2. Description of the Related Art

Universal asynchronous receiver-transmitter (UART) modules allow a data processing apparatus to communicate with another apparatus without any particular clock signal synchronization between the respective devices. A transmitting UART module transmits a serial data signal that comprises consecutive serial bit packets to a receiving UART module. A serial bit packet typically comprises, in order of occurrence, a start bit, a series of data bits, and a stop bit. A serial data packet may further comprise a parity bit for error checking purposes. The parity bit typically occurs between the last data bit and the stop bit.

The serial data signal has a given baud rate. The baud rate is the number of bits per second (bit/s). A standard baud rate for a computer is 115,200 bit/s. Industry standard baud rates of 921,600 bit/s and 3,686,400 bit/s have been derived from the aforementioned standard baud rate. There is some tolerance in the sense that an actual baud rate, which the transmitting UART module produces, may deviate to a certain extent from the standard baud rate of interest. The actual baud rate typically depends on a locally generated clock signal that the transmitting UART module receives.

The receiving UART module samples the serial data signal on the basis of a locally generated clock signal, which need not be synchronized with the locally generated clock signal that the transmitting UART module receives. This accounts for the term "asynchronous". The receiving UART typically samples the serial data signal with a sampling frequency that is 16 times the baud rate plus or minus a frequency error due to asynchrony. The frequency error should remain below a critical threshold in order to avoid data errors.

European patent application published under number 0 605 751 describes a microcomputer that contains a sampling rate selection circuit for dividing a sampling signal from a baud rate generator by a division value, which is set in a sampling rate selection register. Accordingly, the sampling rate of a sampling signal, which is supplied to a shift register, can be switched within the range of multiples of at least two different numbers.

BRIEF SUMMARY

The embodiments of the present disclosure allow cost-efficient implementations of data processing devices that utilize or include a universal asynchronous receiver-transmitter (UART) module.

In accordance with the present disclosure, a UART module includes a sampling controller that assigns a variable number of active edges in a clock signal to respective bits in a serial data signal. A serial data reception path derives a bit from the serial data signal on the basis of the variable number of active edges that the sampling controller has assigned to the bit.

Accordingly, the disclosure allows sampling the serial data signal on the basis of a locally generated clock signal that need not be a multiple of the baud rate. A UART module in accordance with the disclosure may therefore use a clock signal that is specifically generated for another entity in the data processing apparatus of which the UART module forms a part.

For example, in a cellular phone, entities that operate in accordance with a GSM standard may require a clock signal that has a frequency of 26 Megahertz (GSM is an acronym for Global System for Mobile communications). A UART module in accordance with the disclosure can use this clock signal for the purpose of sampling the serial data signal. Consequently, a UART module in accordance with the disclosure does not require a specific clock signal generator.

What is more, a UART module in accordance with the disclosure can cope with various different baud rates whereby a ratio of two different baud rates need not necessarily be an integer number. A single clock signal is sufficient, whereas conventional UART modules require multiple clock signal generators or complicated frequency synthesis structures. For those reasons, the disclosure allows cost-efficient implementations.

An implementation of the present disclosure advantageously includes one or more of the following additional features, each of which contributes to cost-efficiency or reliable bit detection, or both. Different sets of additional features, which correspond with different dependent claims, are presented as different paragraphs.

The sampling controller preferably includes a counter that has a clock input, which receives the clock signal, and a data input that receives a return value, which defines the length of a count cycle in terms of number of active edges. Respective count cycles are assigned to respective bits in the serial bit packet. A selector selectively applies an integer oversampling control value or a modified integer oversampling control value to the data input of the counter.

The modified integer oversampling control value is preferably equal to the integer oversampling control value plus one.

The sampling controller preferably includes a fractional part controller that causes the selector to apply the integer oversampling control value or the modified integer oversampling control value depending on whether a running fractional part is greater or smaller than a fractional part of an oversampling factor, respectively. The running fractional part corresponds with the number of times that the modified integer oversampling control value has been applied to the aforementioned data input of the counter divided by the number of bits of the serial bit packet that have been received.

The fractional part controller preferably includes a modulo counter arranged to decrement a modulo count value by a fractional oversampling control value upon completion of a count cycle in the counter. The modulo counter causes the selector to apply the modified integer oversampling control value to the data input of the counter when a decrement causes a modulus mapping of the modulo count value.

The UART module preferably has control registers for setting the integer oversampling control value and the fractional oversampling control value.

The sampling controller preferably has a sampling clock formatter that applies a sampling clock signal to the serial data reception path. The sampling clock signal comprises an active edge when the counter reaches a predefined value.

The aforementioned predefined value is preferably equal to the return value divided by two and, if needed, rounded off to a nearest integer.

The sampling controller preferably utilizes a count rate controller that applies apply an oversampling pulse signal to an enable input of the counter. The oversampling pulse signal allows the counter to increment a count value at an average rate that corresponds with the frequency of the clock signal divided by R, R being a rational number.

The variable number of active edges in the clock signal that are assigned to the respective bits in the serial data signal, is preferably in the range of 6 and 15.

BRIEF DESCRIPTION OF THE SEVERAL VIEWS OF THE DRAWING(S)

A detailed description with reference to the drawings illustrates the disclosure summarized hereinbefore, as well as the additional features.

DETAILED DESCRIPTION

Figure 1:
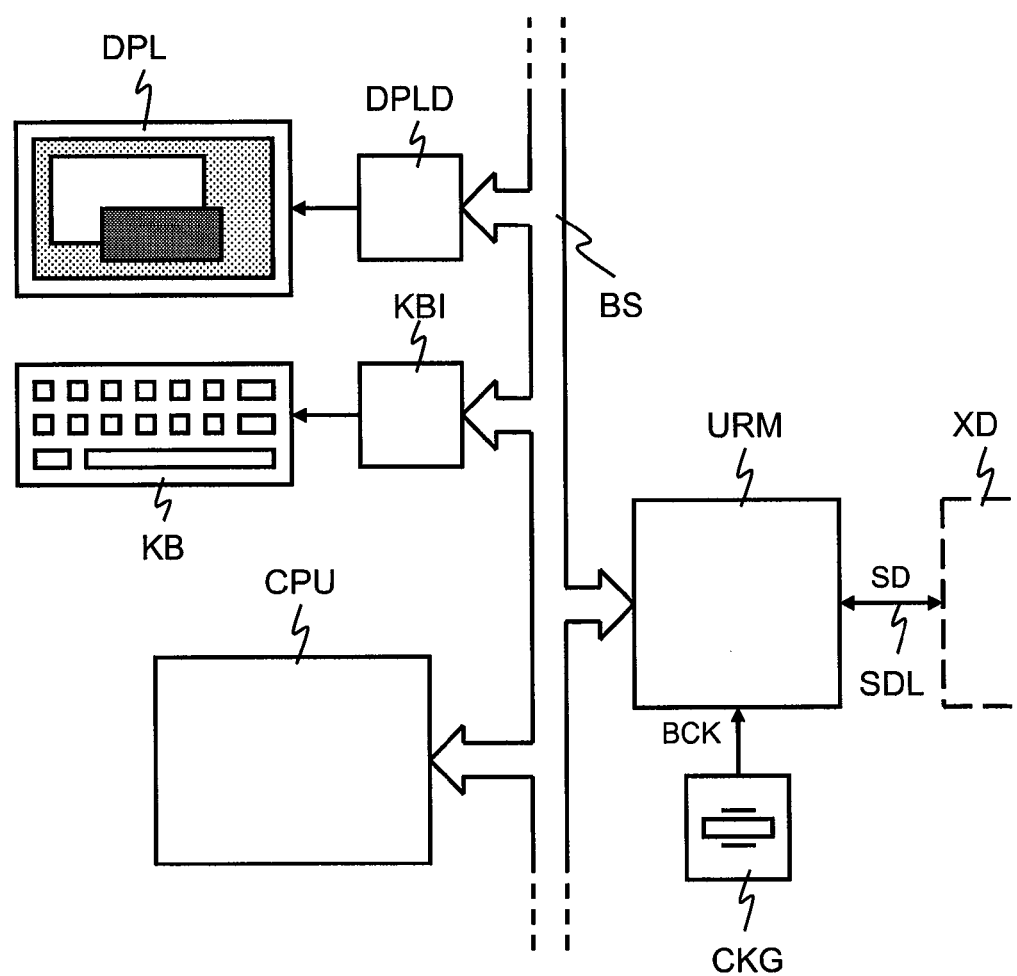
FIG. 1 is a block diagram that illustrates a data processing apparatus, which includes a universal asynchronous receiver-transmitter (UART) module.

FIG. 1 illustrates a data processing apparatus DPA, which may be in the form of, for example, a personal computer, a cellular phone, PDA, or any other type of multimedia or communication apparatus. The data processing apparatus DPA includes a central processing unit CPU that is coupled to various interface devices via a bus system BS. A display driver DPLD is an interface device that allows the central processing unit CPU to display data on a display device DPL. A keyboard interface KBI is an interface device that allows the central processing unit CPU to receive data, which the user enters on a keyboard KB. A universal asynchronous receiver and transmitter (UART) module URM is an interface device that allows the central processing unit CPU to receive data from an external device XD via a serial data link SDL. The UART module URM receives a basic clock signal BCK from a clock signal generator CKG within the data processing apparatus DPA.

The UART module URM receives a serial data signal SD from the external device XD via the serial data link SDL. The serial data signal SD comprises the data to be transmitted in the form of a bitstream, which has a particular format. More specifically, the serial data signal SD comprises consecutive serial bit packets. A serial bit packet comprises a given number of data bits, which may be, for example, 5, 6, 7, or 8. A serial data packet further comprises a start bit and a stop bit for synchronization purposes. The start bit precedes the data bits. The stop bit follows the last data bit of the serial bit packet. The start bit is typically a low level that follows a high level, which corresponds with a falling edge. The serial data signal SD has by default the high level, if no data is transmitted. A serial data packet may further comprise a parity bit for error checking purposes. The parity bit typically precedes the stop bit.

The serial data signal SD has a given baud rate. The baud rate is the number of bits per second (bit/s). A standard baud rate for a computer is 115,200 bit/s. Industry standard baud rates of 921,600 bit/s and 3,686,400 bit/s have been derived from the aforementioned standard baud rate. Baud rates may also be custom defined such as, for example, 3.25 Mbit/s, 3.714 Mbit/s, 3.692 Mbit/s, and 4 Mbit/s. A clock signal within the external device XD determines the baud rate.

The UART module URM samples the serial data signal SD on the basis of the basic clock signal BCK that the clock signal generator CKG provides. The basic clock signal BCK does not have exactly the same frequency as the clock signal in the external device XD, which accounts for the term "asynchronous". A conventional UART module typically samples a serial data signal SD with a sampling frequency that is 16 times the baud rate plus or minus a frequency error due to asynchrony. The frequency error should remain below a critical threshold in order to avoid data errors.

Let it be assumed that a conventional UART module needs to cope with a relatively high baud rate such as, for example, 3.6864 Mbit/s mentioned hereinbefore. In that case, a clock signal is needed having a frequency of 58.9824 Megahertz (MHz), which is relatively high. A conventional UART module may also require a relatively high frequency clock signal if the conventional UART module needs to support one or more other baud rates, which are not multiples or submultiples of each other. For example, a relatively high frequency clock signal is required if the following the baud rates needs to be supported: 3.714 Mbit/s, 3.692 Mbit/s, and 4 Mbit/s, which were mentioned hereinbefore, as well as 3.6864 Mbit/s.

The UART module URM within the data processing apparatus DPA illustrated in FIG. 1, which differs from conventional UART modules, can cope with the aforementioned baud rates on the basis of a relatively low clock frequency. The basic clock signal BCK from the clock signal generator CKG may have a frequency of, for example, 26 MHz.

Figure 2:
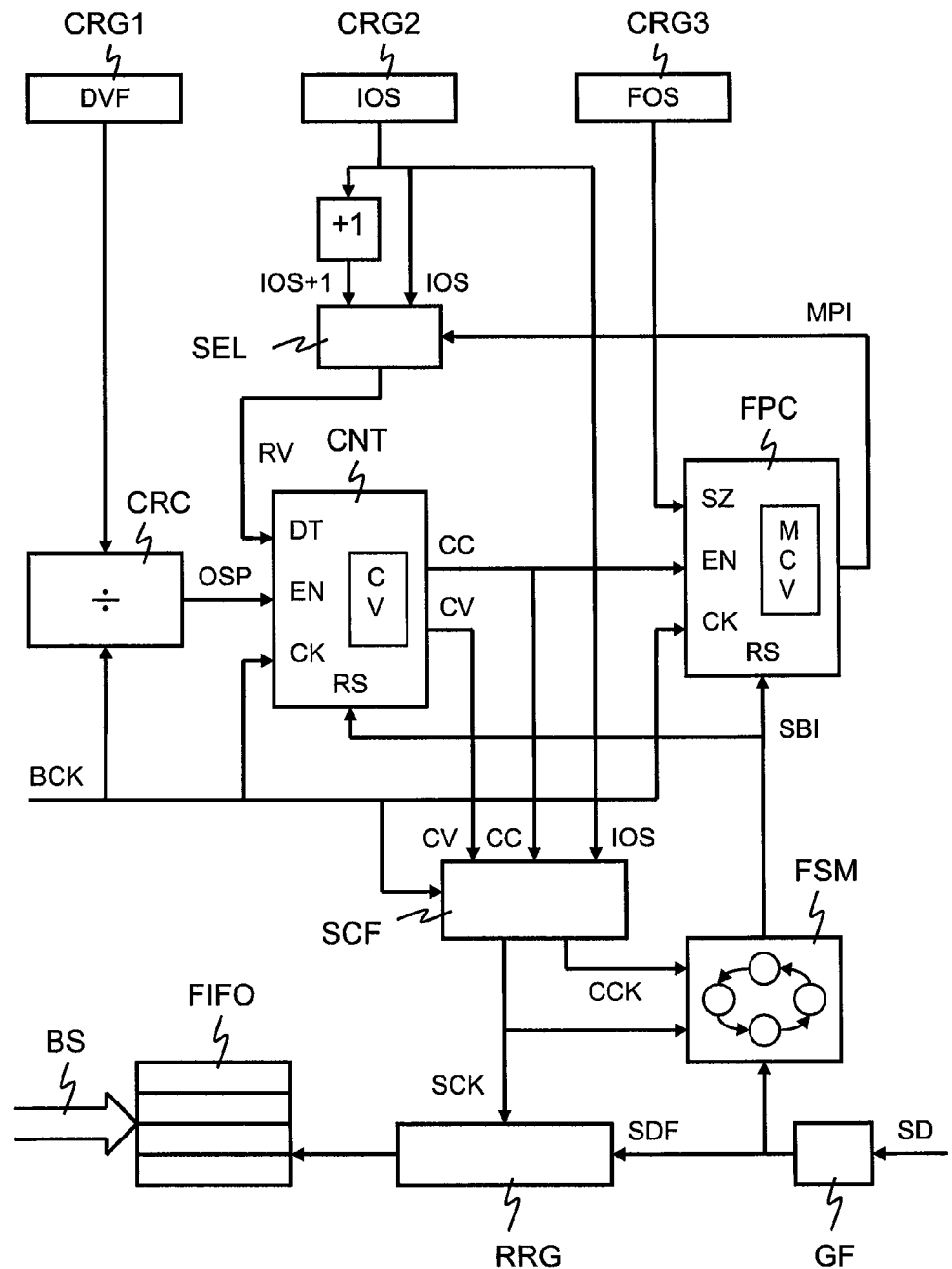
FIG. 2 is a block diagram that illustrates the UART module of the data processing apparatus illustrated in FIG. 1.

FIG. 2 illustrates the UART module URM. A lower portion of FIG. 2 illustrates various functional entities: a glitch filter GF, a reception register RRG, and a data buffer FIFO. These functional entities constitute a serial data reception path. The UART module URM comprises various other functional entities: a count rate controller CRC, a counter CNT, a fractional part controller FPC, a selector SEL, a sampling-and-control clock formatter SCF, and a finite state machine FSM. These functional entities constitute a sampling controller, which effectively controls the serial data reception path. The UART module URM further comprises three control registers CRG1, CRG2, CRG3 for storing control data, which relates to the baud rate of the serial data signal SD. The UART module URM may comprise further functional entities for status monitoring and control purposes, such as, for example, providing an interrupt signal to the central processing unit CPU. FIG. 2 does not illustrate these further functional entities for the sake of simplicity.

The UART module URM basically operates as follows. The glitch filter GF filters the serial data signal SD so as to remove any glitches that could otherwise cause data errors. The reception register RRG receives a filtered serial data signal SDF from the glitch filter GF. The reception register RRG samples the serial data signal SD on the basis of a sampling clock signal SCK. To that end, the sampling clock signal SCK comprises an active edge for each bit in a serial data packet. Consequently, the sampling clock signal SCK has a frequency that corresponds with the baud rate of the serial data signal SD, which the UART module URM receives.

Data bits within a serial data packet are consecutively written into the reception register RRG by means of the sampling clock signal SCK. All data bits in the serial data packet are present in the reception register RRG when the stop bit occurs. The reception register RRG then transfers the data bits to the data buffer FIFO for temporary storage. This constitutes a serial to parallel conversion. The data buffer FIFO transfers the data bits to the central processing unit CPU via the bus system BS on a first-in first-out basis.

The UART module URM generates the sampling clock signal SCK in the following manner. The count rate controller CRC provides an oversampling pulse signal OSP on the basis of the basic clock signal BCK and a division factor DVF, which is stored in control register CRG1. The oversampling pulse signal OSP has a frequency that is equal to that of the basic clock signal BCK divided by the frequency division factor DVF. The count rate controller CRC preferably comprises a so-called fractional frequency divider, which allows the division factor DVF to have an integer part and a fractional part.

The division factor DVF is chosen so that the frequency of oversampling pulse signal OSP is equal to the baud rate of the serial data signal SD multiplied by an oversampling factor. The oversampling factor may be a rational number having an integer part and a fractional part. The oversampling factor may be, for example, a rational number comprised between 6 and 15. The serial data signal SD and the basic clock signal BCK have a frequency relationship, which may mathematically the expressed as:

$$BR = F_{bck} \div [(OSRI + OSRF) \cdot DVF]$$

wherein BR represents the baud rate of the serial data signal SD and, $F_{bck}$ represents the frequency of the basic clock signal BCK, and OSRI and OSRF represent the integer part and the fractional part of the oversampling factor, respectively.

An integer oversampling control value IOS, which is stored in control register CRG2, represents the integer part of the oversampling factor. The integer oversampling control value IOS is equal to the oversampling factor minus one. A fractional oversampling control value FOS, which is stored in control register CRG3, represents the fractional part of the oversampling factor. The fractional oversampling control value FOS is equal to the fractional part of the oversampling factor divided by a unit of fraction. For example, let it be assumed that the oversampling factor is equal to 7.5 and that the unit of fraction is equal to ⅛. In that case, the integer oversampling control value IOS is 7 minus 1, which is equal to 6. The fractional oversampling control value FOS is equal to 4, because ⅘ is equal to 0.5, which is the fractional part.

The counter CNT has an enable input EN that receives the oversampling pulse signal OSP, and a clock input CK that receives the basic clock signal BCK. The oversampling pulse signal OSP comprises a periodically repeating pulse, which is sufficiently narrow to comprise only a single active edge in the basic clock signal BCK. That is, the oversampling pulse signal OSP acts as a gating signal as it were. Accordingly, the counter CNT increments a count value CV by one unit at a rate that corresponds to the frequency of the oversampling pulse signal OSP.

The counter CNT has a data input DT for receiving a return value RV. The return value RV specifies a maximum for the count value CV. Let it be assumed that the count value CV is equal to the return value RV. The count value CV will be set to zero (0) when an active edge occurs in the basic clock signal BCK that coincides with a pulse in the oversampling pulse signal OSP. The counter CNT will begin a new count cycle. That is, the counter CNT increments the count value CV by one unit starting from zero with each active edge in the basic clock signal BCK that coincides with a pulse in the oversampling pulse signal OSP. This count continues until the count value CV is equal to the return value RV that is present at the data input DT. The count cycle is completed and the count value CV will return again to zero for a new count cycle.

The counter CNT provides a cycle completion signal CC that comprises a pulse when the counter CNT has completed a count cycle, that is, when the count value CV is equal to the return value RV. This pulse is sufficiently narrow to comprise only a single active edge in the basic clock signal BCK, as in the oversampling pulse signal OSP. The counter CNT further provides the count value CV as an output signal.

The fractional part controller FPC has an enable input EN that receives the cycle completion signal CC, and a clock input CK that receives the basic clock signal BCK from the clock signal generator CKG. The fractional part controller FPC further has a step size input SZ that receives the fractional oversampling control value FOS, which is stored in control register CRG2. The fractional part controller FPC comprises a modulo-8 counter with a modulo count value MCV.

The fractional part controller FPC decrements the modulo count value MCV by a value that is equal to the fractional oversampling control value FOS when an active edge occurs in the basic clock signal BCK that coincides with a pulse in the cycle completion signal CC. That is, the modulo count value MCV is decremented by the fractional oversampling control value FOS when the counter CNT has completed a count cycle.

Let it be assumed, for example, that the modulo count value MCV is equal to zero and that the fractional oversampling control value FOS is equal to 3. The modulo count value MCV will decrement by 3 as soon as the counter CNT has completed a count cycle. The modulo count value MCV becomes −3 modulo 8, which corresponds with 5. In modular arithmetic, a decrement that would produce a negative value effectively causes a mapping of 0 to the modulus, which is 8 in this case. That is, in modular arithmetic the equation 0−3=−3 becomes 8−3=5; 0 has mapped to 8. Such modulus mapping occurs when a decrement causes the modulo count value MCV to cross zero.

The selector SEL receives a modulus mapping indicator MPI from the fractional part controller FPC. The modulus mapping indicator MPI indicates whether the most recent decrement has caused the modulo count value MCV to cross zero or not. The selector SEL further receives the integer oversampling control value IOS and an incremented integer oversampling control value IOS+1, which is equal to the oversampling control value plus one. The selector SEL selects one of the aforementioned values to constitute the return value RV for the counter CNT. The selector SEL selects the integer oversampling control value IOS if the modulus mapping indicator MPI indicates that the most recent decrement has not caused the modulo count value MCV to cross zero. Conversely, the selector SEL selects the incremented integer oversampling control value IOS+1 to constitute the return value RV if the modulus mapping indicator MPI indicates that the most recent decrement has caused the modulo count value MCV to cross zero.

Figure 3A:
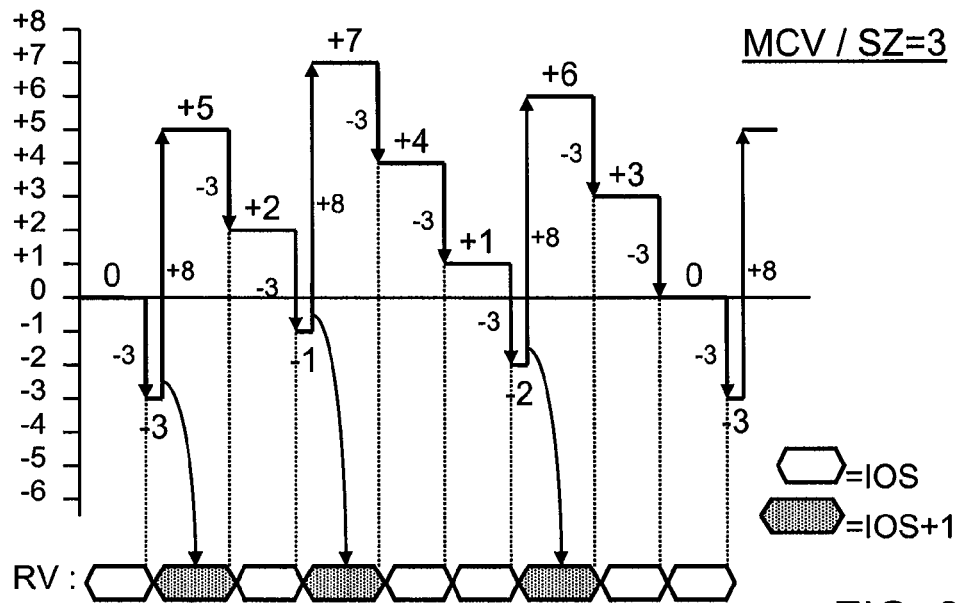
FIGS. 3A and 3B are time diagrams that illustrate a modulo count value and a return value, which are variables within the UART module, for two different fractional oversampling control values.
Figure 3B:
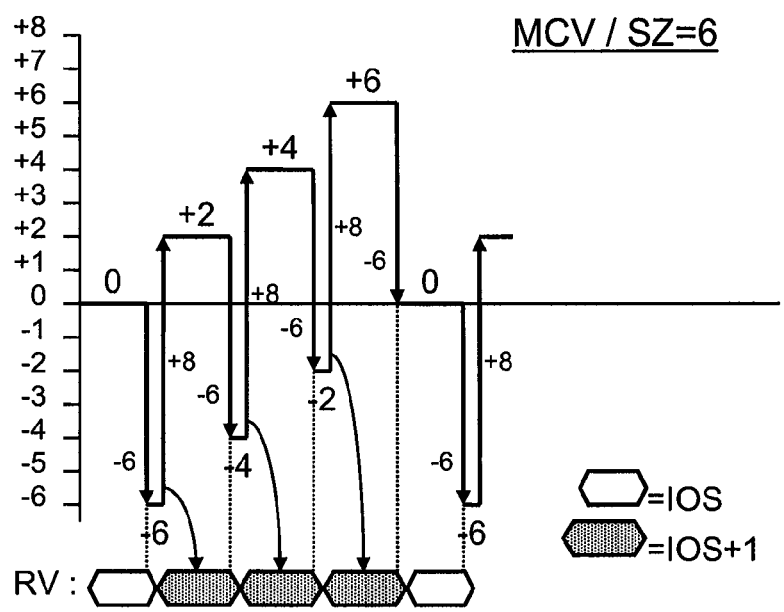

FIGS. 3A and 3B illustrate how the fractional part controller FPC determines the return value RV for the counter CNT. FIGS. 3A and 3B are composite graphs each of which comprises a horizontal axis that represents time and a vertical axis that represents the modulo count value MCV. Each graph further comprises a horizontal bar in a lower portion that represents the return value RV. The horizontal bar indicates whether the integer oversampling control value IOS or the incremented integer oversampling control value IOS+1 constitutes the return value RV. A white hexagonal element represents the integer oversampling control value IOS. A gray hexagonal element represents the incremented integer oversampling control value IOS+1.

FIG. 3A illustrates an evolution of the modulo count value MCV in case the fractional oversampling control value FOS is equal to 3. In FIG. 3A, a vertical arrow that points downward represents a decrement by 3 of the modulo count value MCV, which occurs when the counter CNT has completed a count cycle. A horizontal arrow that points upwards represents a modulus mapping, which occurs when the modulo count value MCV crosses zero. A modulus mapping keeps the modulo count value MCV in a range comprised between 0 and 8, which is the modulus.

A modulus mapping causes the incremented integer oversampling control value IOS+1 to constitute the return value RV for a subsequent count cycle. Consequently, such a count cycle will be somewhat longer than a count cycle for which the integer oversampling control value IOS constitutes the return value RV. Horizontal lines with positive integer value, which corresponds with modulo count value MCV, represent a count cycle of the counter CNT. The return value RV for the counter CNT follows a pattern that comprises 8 count cycles. The integer oversampling control value IOS constitutes the return value RV for 5 of these count cycles, the incremented and oversampling control value constitutes the return value RV for 3 count cycles. The integer part of the oversampling factor is thus effectively equal to $\frac{3}{8}$.

In a similar manner, FIG. 3B illustrates an evolution of the modulo count value MCV in case the fractional oversampling control value FOS is equal to 6. In FIG. 3B, a vertical arrow that points downward represents a decrement by 6 of the modulo count value MCV, which occurs when the counter CNT has completed a count cycle. A vertical arrow that points upwards symbolizes a modulus mapping, which causes the incremented integer oversampling control value IOS+1 to constitute the return value RV for a subsequent count cycle. The return value RV for the counter CNT follows a pattern that comprises 4 count cycles. The integer oversampling control value IOS constitutes the return value RV for 1 of these count cycles, the incremented integer oversampling control value IOS+1 constitutes the return value RV for 3 count cycles. The integer part of the oversampling factor is thus effectively equal to $\frac{3}{4} = \frac{6}{8}$.

Referring again to FIG. 2, the sampling-and-control clock formatter SCF provides the sampling clock signal SCK on the basis of the count value CV in the counter CNT and the integer oversampling control value IOS. The sampling clock signal SCK has an active edge when the count value CV is equal to one half of the integer oversampling control value IOS rounded off, if needed, to a nearest integer. The active edge causes the reception register RRG to take a sample of the filtered serial data signal SDF. Since the active edge occurs when the count value CV is one half of the integer oversampling control value IOS, the sample is taken approximately at the center of a bit period. This allows robust bit detection; there is relatively little risk that a wrong binary value is assigned to the bit concerned.

The sampling-and-control clock formatter SCF further provides a state transition clock signal CCK for the finite state machine FSM. The state transition clock signal CCK comprises an active edge when the counter CNT has completed a count cycle.

The finite state machine FSM keeps track of respective bits in the serial data signal SD. To that end, the finite state machine FSM has respective states that correspond with respective bits in the serial data signal SD. An active edge state in the state transition clock signal CCK may cause the finite state machine FSM to jump from one state to another state. The finite state machine FSM is preferably arranged to provide various different cycles of states to cope with various different types of serial bit packets. The central processing unit CPU illustrated in FIG. 1 may cause the finite state machine FSM to provide a particular cycle of states that corresponds with the serial bit packets in the serial data signal SD.

The finite state machine FSM detects start bits within the filtered serial data signal SDF. The finite state machine FSM provides a start bit indication SBI when the finite state machine FSM detects a start bit. The counter CNT and the fractional part controller FPC each have a reset input that receives the start bit indication SBI. Consequently, the finite state machine FSM resets the counter CNT and the fractional part controller FPC when a start bit occurs in the serial data signal SD.

Figure 4:
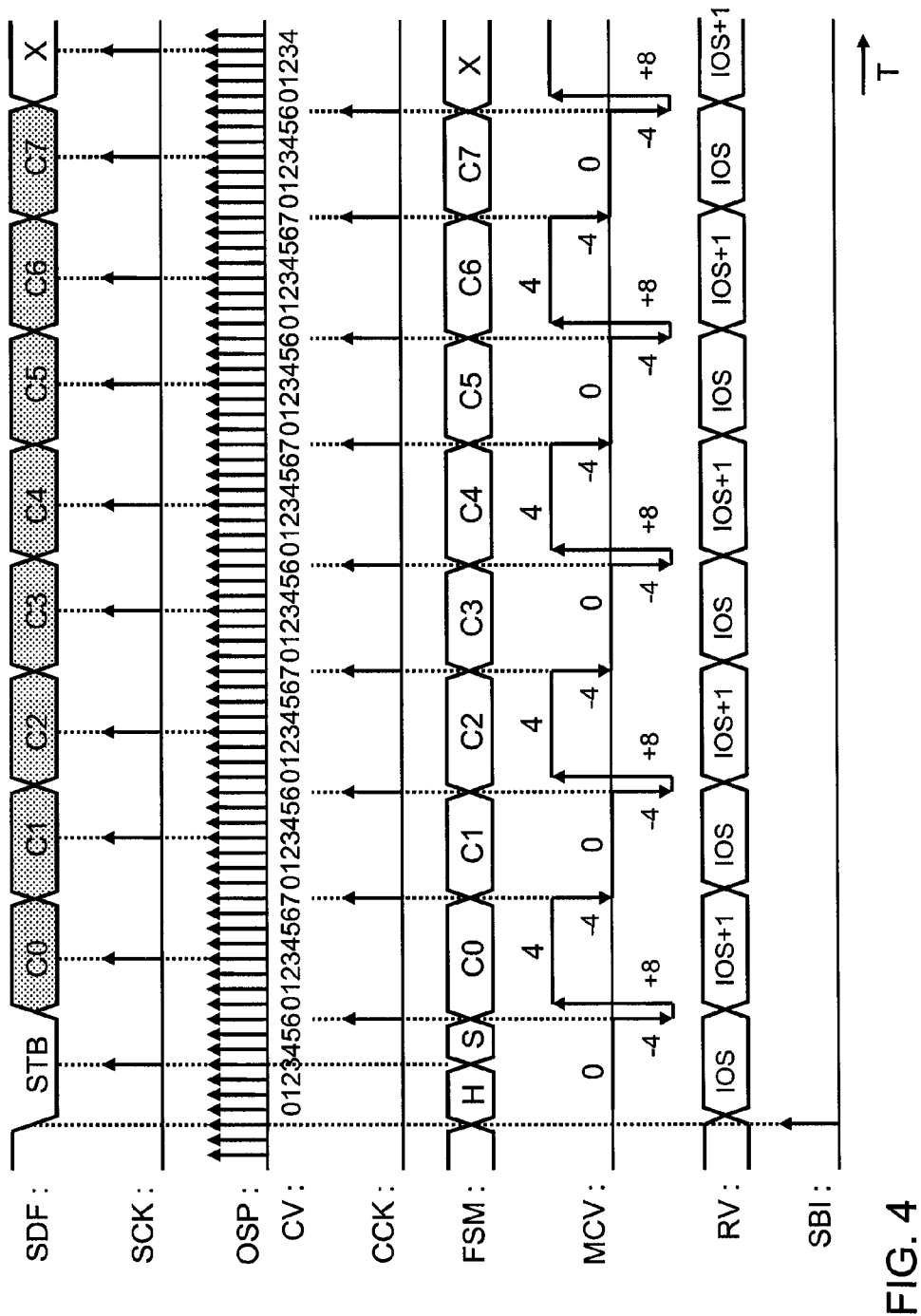
FIG. 4 is a time diagram that illustrates a serial bit packet and various signals and variables within the UART module during reception of the serial bit packet.

FIG. 4 illustrates a mode of operation of the UART module URM illustrated in FIG. 2. FIG. 4 is a composite graph having a common horizontal axis, which represents time, and various graphs disposed as horizontal bars, each of which represents a particular signal or state within the UART module URM. The upper graph represents the filtered serial data signal SDF, which comprises a start bit STB and 8 data bits C0, ..., C8 followed by a stop bit X. Each bit has the same duration, which is called bit period. The baud rate defines the bit period. The sampling clock signal SCK and the state transition clock signal CCK comprises active edges, which are represented by means of vertical arrows that point upward. The oversampling pulse signal OSP comprises pulses, which are also represented by means of vertical arrows that point upward. Such a vertical arrow also represents the start bit STB indicator. FIG. 4 further illustrates respective states H, S, C0, ..., C7, X of the finite state machine FSM, the modulo count value MCV in a manner similar to that of FIGS. 3A and 3B, and the return value RV that applies to the counter CNT.

The following parameters define the mode of operation that FIG. 4 illustrates. The oversampling factor is 7.5. This means that integer oversampling control value IOS is 6 (7 minus 1) and that the fractional oversampling control value FOS is 4 (0.5 multiplied by 8).

The start bit STB is a low level that follows a high level. Consequently, the start bit STB begins with a high-to-low transition. The finite state machine FSM detects this high-to-low transition and provides the start bit indication SBI in response thereto. The start bit indication SBI resets the counter CNT and the fractional part controller FPC so that the count value CV and the modulo count value MCV are set to zero.

The high-to-low transition, which marks the beginning of the start bit STB, brings the finite state machine FSM in a hunt state H. In the hunt state H, the finite state machine FSM checks whether the filtered serial data signal SDF has the low level when an active edge occurs in the sampling clock signal SCK. Accordingly, the finite state machine FSM checks whether the start bit STB is valid, which is the case in FIG. 4. In that case, the finite state machine FSM switches to a start state S, in which the UART module URM is ready to receive the data bits that follow the start bit STB.

The counter CNT goes through a count cycle for each bit in the filtered serial data signal SDF. A count cycle ends when the count value CV is equal to the return value RV, as explained hereinbefore. The return value RV, which applies to a count cycle for a particular bit, may be the integer oversampling control value IOS or the incremented integer oversampling control value IOS+1, which are 6 and 7, respectively. The fractional part controller FPC determines which of the aforementioned value applies to a particular bit on the basis of the fractional oversampling control value FOS, which has been explained hereinbefore with reference to FIGS. 3A and 3B.

The integer oversampling control value IOS, which is 6, constitutes the return value RV for the counter CNT when the start bit STB occurs in the filtered serial data signal SDF. Accordingly, the counter CNT counts to 6, which constitutes the count cycle for the start bit STB. An active edge occurs in the state transition clock signal CCK when this count cycle is completed. The active edge brings the finite state machine FSM into a state that corresponds with the first data bit C0. The modulo count value MCV decrements by 4, which causes a modulus mapping. As a result, the incremented oversampling control value, which is 7, constitutes the return value RV that applies to the next count cycle, which belongs to the first data bit C0. Consequently, the counter CNT will count from 0 to 7. An active edge occurs in the state transition clock signal CCK when the counter CNT reaches 7 so that the count cycle is completed. This active edge brings the finite state machine FSM into a state that corresponds with the second data bit C1. The modulo count value MCV decrements by 4 again so that the modulo count value MCV becomes 0. There is no modulus mapping so that the return value RV for next count cycle will be 6, which is the integer oversampling control value IOS.

Since the fractional oversampling control value FOS is equal to 4, there alternately is a modulus mapping for 1 out of 2 count cycles. Consequently, the integer oversampling control value IOS and the incremented integer oversampling control value IOS+1 alternately constitute the return value RV, which FIG. 4 illustrates. Count cycles alternately comprise 6 and 7 pulses in the oversampling pulse signal OSP.

The sampling clock signal SCK comprises an active edge when the count value CV is equal to 3, which is one half of the oversampling control value. For some bits, the active edge occurs substantially at the center of the bit period. For other bits, the active edge occurs slightly before the center of the bit period. That is, there can be slight deviation from the center of the bit period, which is an ideal sampling instant. The fractional part controller FPC ensures that this deviation is relatively small.

The extent to which an active edge in the sampling clock signal SCK deviates from the center of the bit period of a current bit depends on a running fractional part that applies to the current bit. The running fractional part that applies to the current bit is the number of times the incremented integer oversampling value has constituted the return value RV divided by the number of bits that have already occurred before the current bit and including the current bit. The running fractional part should be as close as possible to the fractional part of the oversampling factor. The fractional part controller FPC ensures that this is the case in the following manner.

The fractional part controller FPC causes the integer oversampling value to constitute the return value RV when the running fractional part was greater than the fractional part of the oversampling factor. Conversely, the fractional part controller FPC causes the incremented integer oversampling value to constitute the return value RV when the running fractional part that applied to a preceding bit was smaller than the fractional part of the oversampling factor. That is, the fractional part controller FPC steers, as it were, the return value RV for the counter CNT so that the running fractional part moves in the direction of the fractional part of the oversampling factor.

In summary, in the universal asynchronous receiver-transmitter module URM illustrated in FIG. 2, the count rate controller CRC, the counter CNT, the fractional part controller FPC, the selector SEL, the sampling-and-control clock formatter SCF, and the finite state machine FSM form the sampling controller, which effectively assigns a variable number of active edges in the basic clock signal BCK to respective bits in the serial data signal SD. The glitch filter GF, the reception register RRG, and the data buffer FIFO form the serial data reception path that derives a bit from the serial data signal on the basis of the variable number of active edges that the sampling controller has assigned to the bit.

The detailed description hereinbefore with reference to the drawings is merely an illustration of the embodiments of the disclosure and the additional features, which are defined in the claims. The disclosure can be implemented in numerous different manners. In order to illustrate this, some alternatives are briefly indicated.

The disclosure may be applied to advantage in any type of product or method that relates to data processing and which involves an asynchronous data transmission. A personal computer, a cellular phone, and a personal digital assistant (PDA) are merely a few examples.

There are numerous different possible implementations of a UART module URM in accordance with the disclosure. FIG. 2 merely illustrates one possible implementation. Some other possible implementations are indicated by reference to FIG. 2. For example, the count rate controller CRC and the control register CRG may be omitted. In that case, the counter CNT counts at a rate that corresponds with the basic clock signal BCK.

The fractional part controller FPC may be replaced by any other type circuit that suitably controls the selector SEL. All what matters is that the integer oversampling control value IOS or the incremented integer oversampling control value IOS1 constitutes the return value RV in accordance with a suitable pattern. Various different suitable patterns for various different fractional parts of an oversampling factor may be stored in a memory. Each pattern is preferably so that the running fractional part is relatively close to the fractional part of the oversampling factor concerned.

The reception register RRG may comprise sophisticated sampling circuitry for taking various samples at different instants within a bit period. In such an implementation, the sampling-and-control clock formatter SCF may be modified so that this entity defines these various different sampling instants. For example, referring to FIG. 4, the respective instants when the count value CV is equal to 2, 3, and 4 may constitute suitable sampling instants. The reception register RRG may then determine the value of the bit concerned on the basis of respective samples that have been taken. A majority vote would be an appropriate strategy to determine the value of the bit. A reliability indication can also be established on the basis of the respective samples.

There are numerous ways of implementing functions by means of items of hardware or software, or both. In this respect, the drawings are very diagrammatic, each representing only one possible embodiment of the disclosure. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the disclosure. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A universal asynchronous receiver-transmitter module comprising:
   a sampling controller arranged to assign a variable number of active edges in a clock signal to respective bits in a serial data signal; and
   a serial data reception path for deriving a bit from the serial data signal on the basis of the variable number of active edges that have been assigned to the bit, wherein the sampling controller comprises:
      a counter having a clock input coupled to receive the clock signal and a data input coupled to receive a return value, which defines the length of a count cycle in terms of number of active edges, whereby respective count cycles are assigned to respective bits in the serial data signal; and
      a selector for selectively applying an integer oversampling control value or a modified integer oversampling control value to the data input of the counter.

2. The universal asynchronous receiver-transmitter module of claim 1, wherein the modified integer oversampling control value is equal to the integer oversampling control value plus one.

3. The universal asynchronous receiver-transmitter module of claim 2, the sampling controller comprising a fractional part controller arranged
   to apply the integer oversampling control value when a running fractional part is greater than a fractional part of an oversampling factor, and
   to apply the modified integer oversampling control value when the running fractional part is smaller than the fractional part of the oversampling factor, the running fractional part being the number of times that the modified integer oversampling control value has been applied to the data input of the counter divided by the number of bits of a serial bit packet that have been received.

4. The universal asynchronous receiver-transmitter module of claim 3, the fractional part controller comprising a modulo counter arranged to decrement a modulo count value by a fractional oversampling control value upon completion of a count cycle in the counter, the modulo counter being arranged to cause the selector to apply the modified integer oversampling control value to the data input of the counter when a decrement causes a modulus mapping of the modulo count value.

5. The universal asynchronous receiver-transmitter module of claim 3 comprising control registers for setting the integer oversampling control value and the fractional oversampling control value.

6. The universal asynchronous receiver-transmitter module of claim 1, wherein the sampling controller comprises a sampling clock formatter arranged to apply a sampling clock signal to the serial data reception path, the sampling clock signal comprising an active edge when the counter reaches a predefined value.

7. The universal asynchronous receiver-transmitter module of claim 6, wherein the predefined value is equal to the return value divided by two and, if needed, rounded off to a nearest integer.

8. The universal asynchronous receiver-transmitter module of claim 1, wherein the sampling controller comprises a count rate controller arranged to apply an oversampling pulse signal to an enable input of the counter, the oversampling pulse signal allowing the counter to increment a count value at an average rate that corresponds with the frequency of the clock signal divided by R, R being a rational number.

9. The universal asynchronous receiver-transmitter module of claim 1, wherein the variable number of active edges in the clock signal that are assigned to the respective bits in the serial data signal, is comprised between 6 and 15.

10. A synchronous data communication method comprising:
    assigning a variable number of active edges in a clock signal to respective bits in a serial data signal during a sampling control step;
    deriving a bit from the serial data signal based on the variable number of active edges assigned to the bit during a serial data reception step;
    receiving an oversampling pulse signal and a clock signal at a counter and incrementing a count value by one unit at a rate that corresponds to a frequency of the oversampling pulse signal; and
    receiving a return value signal at the counter and incrementing the count value by one unit starting from zero with each active edge of the basic clock signal that coincides with a pulse in the oversampling pulse signal.

11. The method of claim 10, comprising applying an integer oversampling control value signal or a modified integer oversampling control value signal to a data input of the counter, the integer oversampling control value is applied when a running fractional part is greater than a fractional part of an oversampling factor, and applying the modified integer oversampling control value when the running fractional part is smaller than the fractional part of the oversampling factor, the running fractional part being the number of times that the modified integer oversampling control value has been applied to the data input of the counter divided by the number of bits of a serial bit packet that have been received.

12. The method of claim 10, comprising applying a sampling clock signal to a serial data reception path, the sampling clock signal comprising an active edge when the count reaches a predefined value that is equal to the return value divided by two and, if necessary, rounded off to a nearest integer.

13. A computer program product for a programmable processor, the computer program product comprising a set of instructions that, when loaded into the programmable processor, causes the programmable processor to carry out a method comprising:
    assigning a variable number of active edges in a clock signal to respective bits in a serial data signal during a sampling control step;

deriving a bit from the serial data signal based on the variable number of active edges assigned to the bit during a serial data reception step;

receiving an oversampling pulse signal and a clock signal at a counter and incrementing a count value by one unit at a rate that corresponds to a frequency of the oversampling pulse signal; and receiving a return value signal at the counter and incrementing the count value by one unit starting from zero with each active edge of the basic clock signal that coincides with a pulse in the oversampling pulse signal.

14. The product of claim 13, comprising applying an integer oversampling control value signal or a modified integer oversampling control value signal to a data input of the counter, the integer oversampling control value is applied when a running fractional part is greater than a fractional part of an oversampling factor, and applying the modified integer oversampling control value when the running fractional part is smaller than the fractional part of the oversampling factor, the running fractional part being the number of times that the modified integer oversampling control value has been applied to the data input of the counter divided by the number of bits of a serial bit packet that have been received.

15. A data processing apparatus comprising a universal asynchronous receiver-transmitter module for receiving data from another data processing apparatus, comprising:

a sampling controller arranged to assign a variable number of active edges in a clock signal to respective bits in a serial data signal;

a serial data reception path for deriving a bit from the serial data signal based on the variable number of active edges assigned to the bit, wherein the sampling controller comprises:

a counter having a clock input coupled to receive the clock signal and a data input coupled to receive a return value, which defines the length of a count cycle in terms of number of active edges, whereby respective count cycles are assigned to respective bits in the serial data signal; and a selector for selectively applying an integer oversampling control value or a modified integer oversampling control value to the data input of the counter.

16. The data processing apparatus of claim 15, wherein the sampling controller comprises a fractional part controller arranged to apply the integer oversampling control value when a running fractional part is greater than a fractional part of an oversampling factor, and to apply the modified integer oversampling control value when the running fractional part is smaller than the fractional part of the oversampling factor, the running fractional part being the number of times that the modified integer oversampling control value has been applied to the data input of the counter divided by the number of bits of a serial bit packet that have been received.

* * * * *

UNITED STATES PATENT AND TRADEMARK OFFICE
CERTIFICATE OF CORRECTION

PATENT NO. : 8,331,427 B2
APPLICATION NO. : 12/876782
DATED : December 11, 2012
INVENTOR(S) : Sandeep Agrawal, Sathya Jaganathan and Johannes Boonstra It is certified that error appears in the above-identified patent and that said Letters Patent is hereby corrected as shown below:

In column 5, line 24, please change "$F_{bck}$" to --$F_{bck}$--;

In column 5, line 27, please change "$F_{bck}$" to --$F_{bck}$--.

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,331,427 B2
APPLICATION NO. : 12/876782
DATED : December 11, 2012
INVENTOR(S) : Agrawal et al.

It is certified that error appears in the above-identified patent and that said Letters Patent is hereby corrected as shown below:

On the title page, item 75 under "Inventors", in Column 1, Line 1, delete "Eindhoven (IN);" and insert -- Eindhoven (NL); --, therefor.

In the specification

In Column 10, Line 34, delete "IOS1" and insert -- IOS+1 --, therefor.

Signed and Sealed this
Thirty-first Day of May, 2016

Michelle K. Lee
*Director of the United States Patent and Trademark Office*